United States Patent
Kakade et al.

(10) Patent No.: US 11,407,278 B2
(45) Date of Patent: Aug. 9, 2022

(54) VEHICLE CABIN THERMAL MANAGEMENT SYSTEM

(71) Applicant: GM GLOBAL TECHNOLOGY OPERATIONS LLC, Detroit, MI (US)

(72) Inventors: Rupesh S. Kakade, West Bloomfield, MI (US); Milan Prakash, Bengaluru (IN); Todd M. Tumas, Taylor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 250 days.

(21) Appl. No.: 16/583,490

(22) Filed: Sep. 26, 2019

(65) Prior Publication Data
US 2021/0094388 A1     Apr. 1, 2021

(51) Int. Cl.
*B60H 1/00*    (2006.01)
*F28F 27/00*   (2006.01)
*B60H 1/22*    (2006.01)

(52) U.S. Cl.
CPC ..... *B60H 1/00892* (2013.01); *B60H 1/00321* (2013.01); *B60H 1/2218* (2013.01); *F28F 27/00* (2013.01); *B60H 2001/00942* (2013.01); *B60H 2001/2228* (2013.01); *B60H 2001/2237* (2013.01); *B60H 2001/2265* (2013.01)

(58) Field of Classification Search
CPC .... B60H 2001/2265; B60H 2001/2228; B60H 2001/2237; B60H 2001/2218; B60H 1/2218; B60H 1/00892; B60H 1/00321; B60H 2001/00942; F28F 27/00
See application file for complete search history.

(56) References Cited

U.S. PATENT DOCUMENTS

| | | | |
|---|---|---|---|
| 8,316,650 B2 * | 11/2012 | Yang | B60H 1/00478 62/3.61 |
| 9,025,942 B2 | 5/2015 | Kamiyama | |
| 9,873,309 B2 * | 1/2018 | Sagou | B60H 1/2218 |
| 9,963,013 B2 * | 5/2018 | Satzger | B60H 1/2218 |
| 10,393,595 B2 | 8/2019 | Kakade et al. | |
| 10,906,378 B2 * | 2/2021 | Bando | B60H 1/22 |
| 2004/0164171 A1 * | 8/2004 | Eisenhour | B60H 1/00064 236/49.3 |
| 2005/0199735 A1 * | 9/2005 | Eisenhour | G01K 7/42 236/1 C |
| 2010/0187211 A1 * | 7/2010 | Eisenhour | B60H 1/00742 219/202 |

(Continued)

FOREIGN PATENT DOCUMENTS

GB    2547881 A  *  9/2017  ......... B60H 1/00742

*Primary Examiner* — Jenna M Hopkins
(74) *Attorney, Agent, or Firm* — Vivacqua Crane PLLC

(57) ABSTRACT

A vehicle cabin thermal management system includes a first heat exchange system adapted to operate primarily based upon a convective mode of heat transfer within a vehicle cabin, a second heat exchange system adapted to operate primary based upon a non-convective mode of heat transfer within the vehicle cabin, and a controller in communication with the first heat exchange system and the second heat exchange system, wherein the controller controls a thermal output of the second heat exchange system, and wherein the controller controls the first heat exchange system to reduce the operating level of the first heat exchange system in response to the controller operating the second heat exchange system.

13 Claims, 4 Drawing Sheets

(56) References Cited

U.S. PATENT DOCUMENTS

2016/0214456 A1* 7/2016 Maranville ........ B60H 1/00971
2018/0195911 A1* 7/2018 Kakade ................. G01K 13/02
2019/0070930 A1   3/2019 Bando
2021/0094388 A1* 4/2021 Kakade ................ B60H 1/2218

* cited by examiner

VEHICLE CABIN THERMAL MANAGEMENT SYSTEM

The present disclosure relates to a vehicle cabin thermal management system.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicle cabin thermal management systems typically rely upon a heating/ventilation and air conditioning (HVAC) system which primarily relies upon a convection in order to transfer heat from the HVAC system to the vehicle cabin. These HVAC systems suffer from a number of downsides including noisy blower motors or fans for moving air through the system and into the vehicle cabin and a significantly reduced ability to provide a high level of heat transfer in certain conditions such as, for example, when the propulsion system, which serves as a source of heat for the HVAC system, initially starts up and requires an amount of time to warm up before being able to provide a desired level of heat to the HVAC system. Additionally, during an initial warm up period, the HVAC system may be consuming a high amount of power when the system is not able to provide a desired level of heat to the vehicle cabin.

SUMMARY

In an exemplary aspect, a vehicle cabin thermal management system includes a first heat exchange system adapted to operate primarily based upon a convective mode of heat transfer within a vehicle cabin, a second heat exchange system adapted to operate primary based upon a non-convective mode of heat transfer within the vehicle cabin, and a controller in communication with the first heat exchange system and the second heat exchange system, wherein the controller controls a thermal output of the second heat exchange system, and wherein the controller controls the first heat exchange system to reduce the operating level of the first heat exchange system in response to the controller operating the second heat exchange system.

In another exemplary aspect, the first heat exchange system includes a heating/ventilation and air conditioning (HVAC) system.

In another exemplary aspect, the HVAC system includes a blower motor and a heat exchanger.

In another exemplary aspect, the second heat exchange system includes a radiant heater.

In another exemplary aspect, the second heat exchange system includes a conductive heater.

In another exemplary aspect, the conductive heater includes a seat heating element.

In another exemplary aspect, the controller reduces the thermal output of the second heat exchange system and increases the power consumption of the first heat exchange system in response to the reduction in thermal output of the second heat exchange system.

In another exemplary aspect, a vehicle with a vehicle cabin thermal management system includes an HVAC module adapted to operate primarily based upon a convective mode of heat transfer within a vehicle cabin, a radiant heating device adapted to operate primary based upon a radiant mode of heat transfer within the vehicle cabin, and a controller in communication with the HVAC module and the radiant heating device, wherein the controller controls a thermal output of the radiant heating device, and wherein the controller controls the HVAC module to reduce the operating level of the HVAC module in response to the controller operating the radiant heating device.

In another exemplary aspect, a vehicle with a vehicle cabin thermal management system includes a first heat exchange system adapted to operate primarily based upon a convective mode of heat transfer within a vehicle cabin, a second heat exchange system adapted to operate primary based upon a non-convective mode of heat transfer within the vehicle cabin, and a controller in communication with the first heat exchange system and the second heat exchange system, wherein the controller comprises a non-transitory computer readable medium including a first module configured to operate the second heat exchange system to an operating level, a second module configured to determine a temperature offset based upon on an operating level of the second heat exchange system, and a third module configured to calculate a cabin heating demand based upon a target comfort temperature that is offset by the temperature offset, wherein the controller controls the operation of the first heat exchange system based upon the calculated cabin heating demand.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
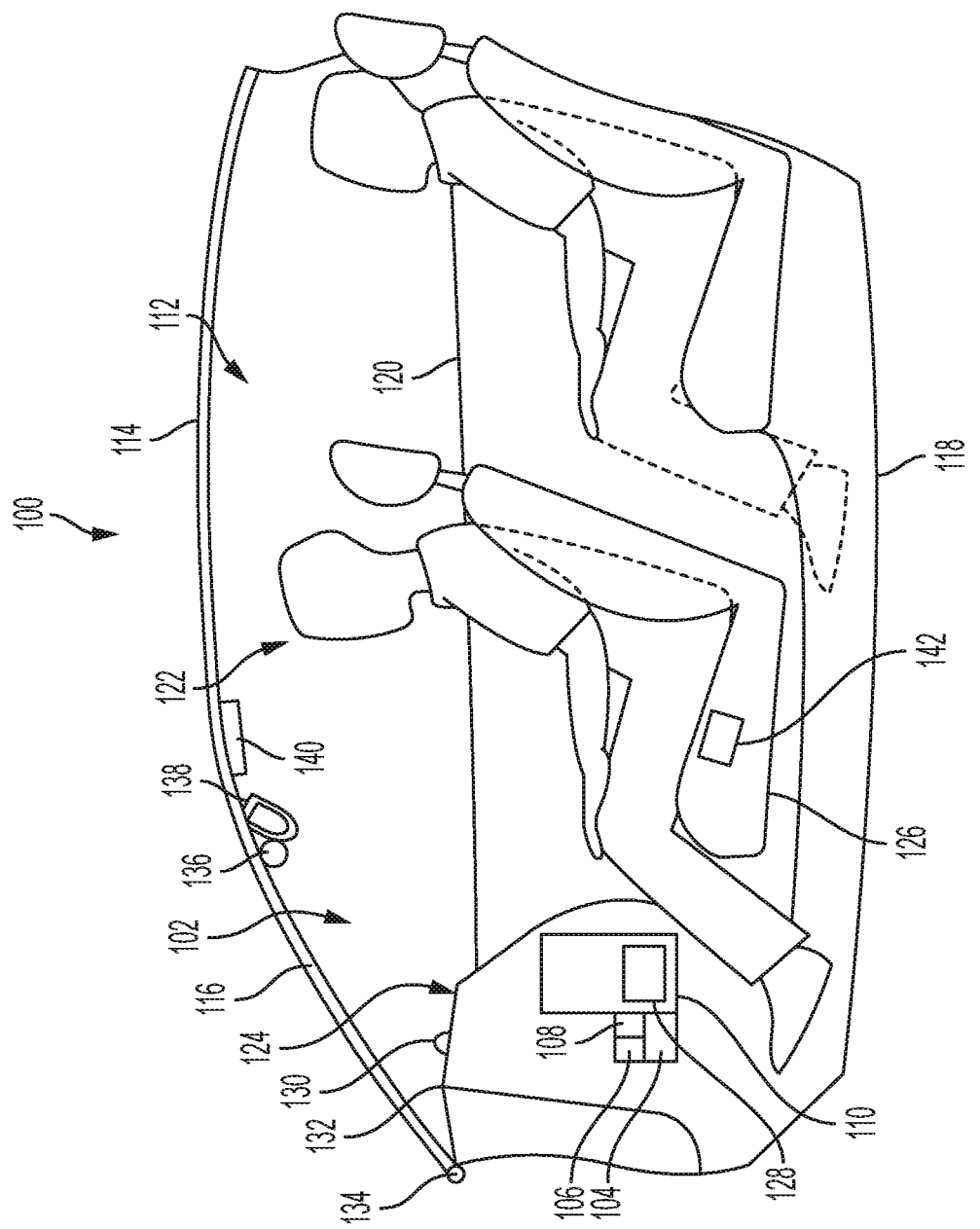
FIG. 1 is a schematic illustration of a vehicle including an exemplary vehicle cabin thermal management system in accordance with the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of control systems, and that the vehicle system described herein is merely one example embodiment.

For the sake of brevity, conventional techniques related to signal processing, data transmission, signaling, control, and other functional aspects of the systems (and the individual operating components of the systems) may not be described in detail herein. Furthermore, the connecting lines shown in the various FIG.s contained herein are intended to represent example functional relationships and/or physical couplings between the various elements. It should be noted that many alternative or additional functional relationships or physical connections may be present in various embodiments.

With reference now to FIG. 1, a vehicle 100 is shown to include a vehicle cabin thermal management system 102 in accordance with various embodiments. Although the FIGS shown herein depict an example with certain arrangements of elements, additional intervening elements, devices, features, or components may be present in actual embodiments. It should also be understood that FIG. 1 is merely illustrative and may not be drawn to scale.

As shown, the vehicle 100 includes at least one controller 104. The controller 104 is further described herein as being dedicated to automatic climate control, e.g. a cabin thermal management controller 104. However, the controller 104 may have more extensive functionality relating to control of the vehicle 100. For example, the controller 104 may control one or more components of the vehicle 100. The components may be associated with autonomous or semi-autonomous systems of the vehicle 100. For example, the controller 104 may control vehicle components of a braking system (not shown), a steering system (not shown), and/or a chassis system (not shown) of the vehicle 100 each of which may be autonomously controlled (e.g., without driver input) and/or semi-autonomously controlled (e.g., with some driver input).

In various embodiments, the controller 104 includes at least one processor 106 and memory 108. The memory 108 stores instructions that can be performed by the processor 106 including the automatic climate control and vehicle cabin thermal management methods described herein. The instructions stored in memory 108 may include one or more separate programs, each of which includes an ordered listing of executable instructions for implementing logical functions.

When the controller 104 is in operation, the processor 106 is configured to execute the instructions stored within the memory 108, to communicate data to and from the memory 108, and to generally control operations of the vehicle 100 pursuant to the instructions. The processor 106 can be any custom made or commercially available processor, a central processing unit (CPU), an auxiliary processor among several processors associated with an HVAC module 110, a semiconductor-based microprocessor (in the form of a microchip or chip set), a macroprocessor, or generally any device for executing instructions.

In various embodiments, the processor 106 executes the instructions of the vehicle cabin thermal management system 102. In general, the vehicle cabin thermal management system 102 is configured to manage a cabin temperature of the vehicle 100. The cabin temperature estimation may be based on solving a heat balance equation with terms for heat transfer to a cabin 112 of the vehicle 100 and optionally at least one of heat transfer from a heating, ventilating and cooling devices in the vehicle 100, as described further below. The vehicle cabin thermal management system 102 may use the cabin temperature estimation as an input for controlling one or more heat transfer device settings.

With reference now to FIG. 1, a portion of a vehicle 100 is shown. The vehicle 100 includes a passenger compartment or cabin 112 which is enclosed by a roof 114, a windshield 116, a floor 118, and doors 120 with windows 122. While the exemplary embodiment illustrated and described in the present disclosure includes a roof it is to be understood that the present invention is equally applicable to other vehicle configurations, including those having a convertible roof. The windows 122 may include, for example, front left, front right, rear left and rear right windows 122. An instrument panel 124 is located in front of the driver seat 126. The HVAC module 110 (or air conditioning unit), which is part of the vehicle cabin thermal management system 102, is located behind the instrument panel 124. A blower 128 is fluidly connected to the HVAC module 110 to cause air flow through the module 110. The HVAC module 110 includes the thermal management controller 104 which includes the processor 106 and the memory 108.

The vehicle cabin thermal management system 102 includes one or more temperature sensors for obtaining a temperature a surface of the vehicle 100. The one or more temperature sensors may be implemented by a thermistor, an infrared sensor or some other temperature sensor. The one or more temperature sensors may be mounted to the instrument panel 124 or the windshield 116 or elsewhere to allow surface temperature measurements to be obtained. In one embodiment, a solar load sensor 130 is included, which may be mounted on a top surface 132 of the instrument panel 124 to measure the temperature at this location as well as the intensity and optionally an angle of solar load. In various embodiments, the vehicle cabin thermal management system 102 includes an ambient air temperature sensor 134 that measures the ambient air temperature outside of the vehicle 100. In various embodiments, the vehicle cabin thermal management system 102 includes a windshield temperature sensor 136. The windshield temperature sensor 136 may be included in a Relative Humidity Sensor, RHS, located on the cabin side of the windshield 116 behind the rearview mirror 138. The one or more temperature sensors are in communication with the thermal management controller 104.

The vehicle cabin 112 also includes a radiant heater 140 that is mounted to the roof 114. The radiant heater 140 is in communication with the cabin thermal management controller 104 and is responsive to signals from the controller 104 to adjust operating settings. While the exemplary embodiment illustrated in the present disclosure positions the radiant heater 140 in a roof area of the cabin 112 it is to be understood that the radiant heater 140 may be positioned anywhere within the vehicle cabin 112. The vehicle cabin 112 further includes a seat heater 142 positioned in a front driver seat 126 of the vehicle. The seat heater 142 may be positioned anywhere within any seat within the vehicle, without limitation. The seat heater 142 is also in communication with the cabin thermal management controller 104 and is responsive to signals from the controller 104 to adjust operating settings.

In an exemplary embodiment of the present disclosure, a cabin heating demand is calculated for the HVAC system using the cabin's thermal environment and cabin occupant inputs. The HVAC system's conditioning of the cabin, heating or cooling is primarily based on convection heat transfer, that is forced air at a predetermined target temperature and velocity is circulated in the cabin. The cabin heating demand, therefore, may be thought of as a target convection energy and is calculated using the following equation:

$$\text{Cabin Heating Demand} = \Sigma h_i A_i (T_{Surface\ i} - T_{Comfort})$$

Where h is a convection heat transfer coefficient for cabin interior surfaces such as the windshield, side glasses, dashboard, doors, roof, floor, etc., A is a surface area for the cabin interior surfaces, Tsurface is a calculated temperature for the cabin interior surfaces and Tcomfort is a cabin interior comfort temperature which is either a calculated value by the climate control system, a user input, or a combination of both. In the above equation i is an index to the several cabin interior surfaces. For the front occupant's comfort, only the front surfaces are used. The surfaces that are shared between front and rear of the passenger cabin can have surface areas reduced to half in the above equation when solving for the front occupants only.

In case of cabin heating, the target convection energy or the heating demand (the result of the above equation) will be negative (the cabin interior surface temperatures are expected to be less than the cabin interior comfort temperature) and it will be positive for cabin cooling (surface temperatures are greater than the comfort temperature). In conventional vehicle cabin thermal management systems, the higher the magnitude of the cabin heating demand, positive or negative, the harder the HVAC system will work (for cabin cooling or heating) to meet comfort needs of the occupant(s). For example, a higher cabin heating demand for a conventional vehicle cabin thermal management system will result in the HVAC module being operated at a very high energy consumption level where a blower motor will be operated at a high level. This results in, not only a high energy consumption, but also a high level of noise in the cabin.

In stark contrast to these conventional systems, the present disclosure provides a vehicle cabin thermal management system in which the operation of the HVAC module is controlled to a reduced power consuming condition when other heat transfer devices such as, for example, radiant panels and/or seat heaters may be relied upon as a source for heat transfer. For example, in an initial start-up condition, the HVAC module may not be capable of providing a high level of heat transfer because the propulsion system, which is the primary source of heat for the HVAC module, may not yet be warm enough to provide a desired amount of heat to satisfy the cabin heating demand. In such a condition, the exemplary vehicle cabin thermal management system of the present disclosure may rely upon other heat transfer devices, such as, for example, a radiant heater, to supplement the HVAC module. In this manner, the operating level of the HVAC module maybe reduced, which reduces the power consumption of the HVAC module and also reduces the noise generated by the HVAC module. Other heat transfer devices which do not rely primarily upon a convective mode of heat transfer, but rather rely primarily upon non-convective modes of heat transfer, such as, for example, radiant or conductive heat transfer devices are generally capable of providing high levels of heat transfer to the cabin and the occupants within the cabin than the HVAC module in some conditions, like that experienced during an initial start-up condition.

In an exemplary embodiment of the present disclosure, the vehicle cabin thermal management system adjusts the cabin heating demand equation described above by providing an offset to Tcomfort based upon operation of a non-convective mode heat transfer device. Offsetting the Tcomfort value will reduce the cabin heating demand that is relied upon by the HVAC module for determining operation of the HVAC module. The following table may be used by an exemplary embodiment of the vehicle cabin thermal management system of the present disclosure to provide an offset to the Tcomfort value under certain conditions. For example, in an initial warm up condition where the outside air temperature is about negative ten degrees Celsius and with a Target Heating Demand of about 3500 KiloWatts, the exemplary vehicle cabin thermal management system may use an offset value of negative eleven degrees Celsius. In this manner, the vehicle cabin thermal management system reduces the power consumption of the HVAC module by operating the HVAC module at a lower level. This also has the effect of reducing the noise that might otherwise be generated by the HVAC module.

|  |  | Target Heating Demand (kW) | | | |
|---|---|---|---|---|---|
| Offset to Tcomfort | | −3500 | −2000 | −1000 | 0 |
| Outside Air Temperature (° C.) | −10 | −11 | −11 | −7 | −3 |
| | 0 | −11 | −7 | −3 | 0 |
| | 10 | −11 | −7 | −3 | 0 |
| | 20 | −3 | −3 | 0 | 0 |
| | 25 | 0 | 0 | 0 | 0 |

In an exemplary embodiment, the offsets are determined based on the amount of heat transfer to the occupants by non-convective mode heat transfer devices. The magnitude of the offset may be determined in a manner which ensures that the heat input into the cabin or onto the occupants exceeds the cabin heating demand or matches the cabin heating demand in a condition where only the HVAC module is operating. The heat added by the direct heating devices is used to reduce the heat demand on the HVAC heating. In an exemplary embodiment, the direct heating devices are operated at four levels: OFF, LEVEL 1, LEVEL 2 and LEVEL 3. Each level has a known amount of heat transfer to the occupant. It varies with the occupants' clothing and therefore the Outside Air Temperature based clothing insulation assumption is made to determine the offset to the comfort temperature. The heat addition is the maximum at LEVEL 3 and is gradually reduced to LEVEL 2 and LEVEL 1 primarily to avoid excessive heat transferred by these devices to the occupants. In an exemplary embodiment, the cabin heating demand and the outside air temperature are used to determine the level of operation of the direct heating devices using the below table:

| LEVEL of Heating | | Target Heating Demand (kW) | | | |
|---|---|---|---|---|---|
| (Conduction and Radiation) | | −3500 | −2000 | −1000 | 0 |
| Outside Air Temperature (° C.) | −10 | 3 | 3 | 2 | 1 |
| | 0 | 3 | 2 | 1 | 0 |
| | 10 | 3 | 2 | 1 | 0 |

| LEVEL of Heating (Conduction and Radiation) | Target Heating Demand (kW) | | | |
|---|---|---|---|---|
| | −3500 | −2000 | −1000 | 0 |
| 20 | 1 | 1 | 0 | 0 |
| 25 | 0 | 0 | 0 | 0 |

This table for the level of non-convective heating and the table for the offset to the comfort temperature match each other. The non-convective heating devices are the local heating devices having a more direct effect on a local body part of the occupants than heating up the entire occupant's body or the cabin interior. Keeping these devices to their maximum power level or at LEVEL 3 for a long period of time can lead to discomfort. Therefore, in an exemplary embodiment, even if the whole body is slightly cool or the cabin interior is overall considered cold, the operating level of these non-convective heat transfer devices are reduced. Every time the operating level of a non-convective heat transfer devices is reduced, the offset to the comfort temperature is reduced which increases the operating level of the HVAC module.

The offsets can be determined individually for heat transfer devices operating primarily based upon conductive and radiative heat transfer modes. Likewise, heat transfer devices operating primarily based upon conductive and radiative heat transfer modes can be operated at different levels based on the capacity of each non-convective heat transfer device to transfer heat to a vehicle occupant. For the above two example table values, conductive and radiant heat transfer levels can be correlated to the following offset to the comfort temperature:

| LEVEL | Offset to the Comfort Temperature (° C.) |
|---|---|
| 0 | 0 |
| 1 | −3 |
| 2 | −7 |
| 3 | −11 |

Figure 2:
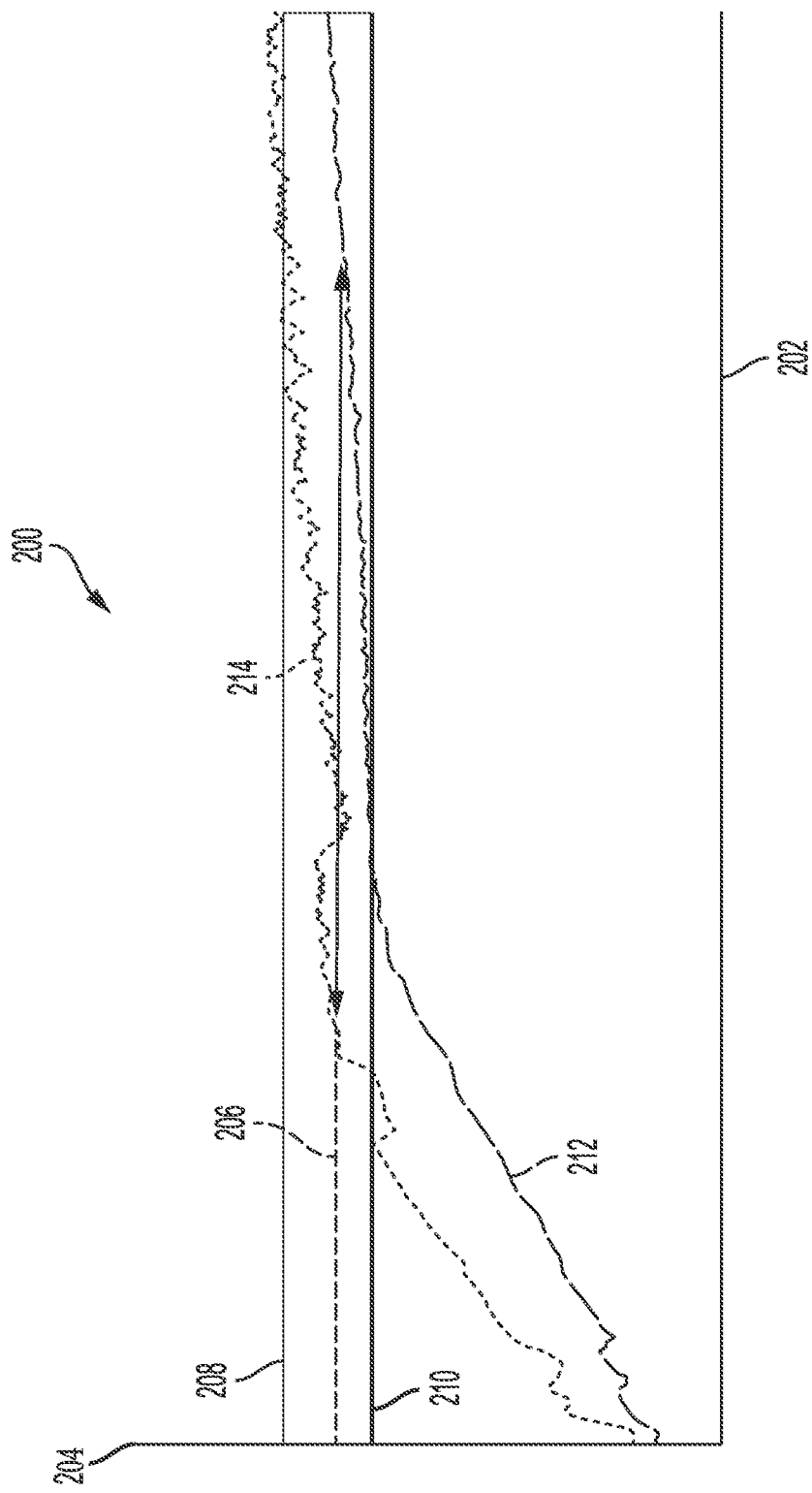
FIG. 2 is a graph illustrating the reduced time to comfort for a vehicle occupant when using the vehicle cabin thermal management system of the present disclosure in comparison to a conventional vehicle cabin thermal management system.

In addition to the benefits and advantages above of reducing the power consumption and noise levels of the HVAC module, in practical application the inventors discovered that the vehicle cabin thermal management system of the present disclosure also provides the additional benefit of reducing the time to comfort for a vehicle occupant. The graph 200 of FIG. 2 illustrates the reduced time to comfort for a vehicle occupant when using the vehicle cabin thermal management system of the present disclosure in comparison to a conventional vehicle cabin thermal management system. The horizontal axis 202 of the graph 200 represents the elapse of time while the vertical axis 204 of the graph 200 represents the comfort level of a vehicle occupant. Horizontal line 206 represents a target comfort level, line 208 represents a slightly warm comfort level and line 210 represents a slightly cold comfort level. The goal is to maintain vehicle occupant comfort between lines 208 and 210 while being as close as possible to line 206. The comfort level for a conventional vehicle cabin thermal management system is illustrated by line 212 and the comfort level achieved by the inventive vehicle cabin thermal management system of the present disclosure is illustrated by line 214. As is clearly illustrated by FIG. 2, the inventive vehicle cabin thermal management system of the present disclosure achieves the target comfort level 206 much earlier than the conventional vehicle cabin thermal management system.

Figure 3:
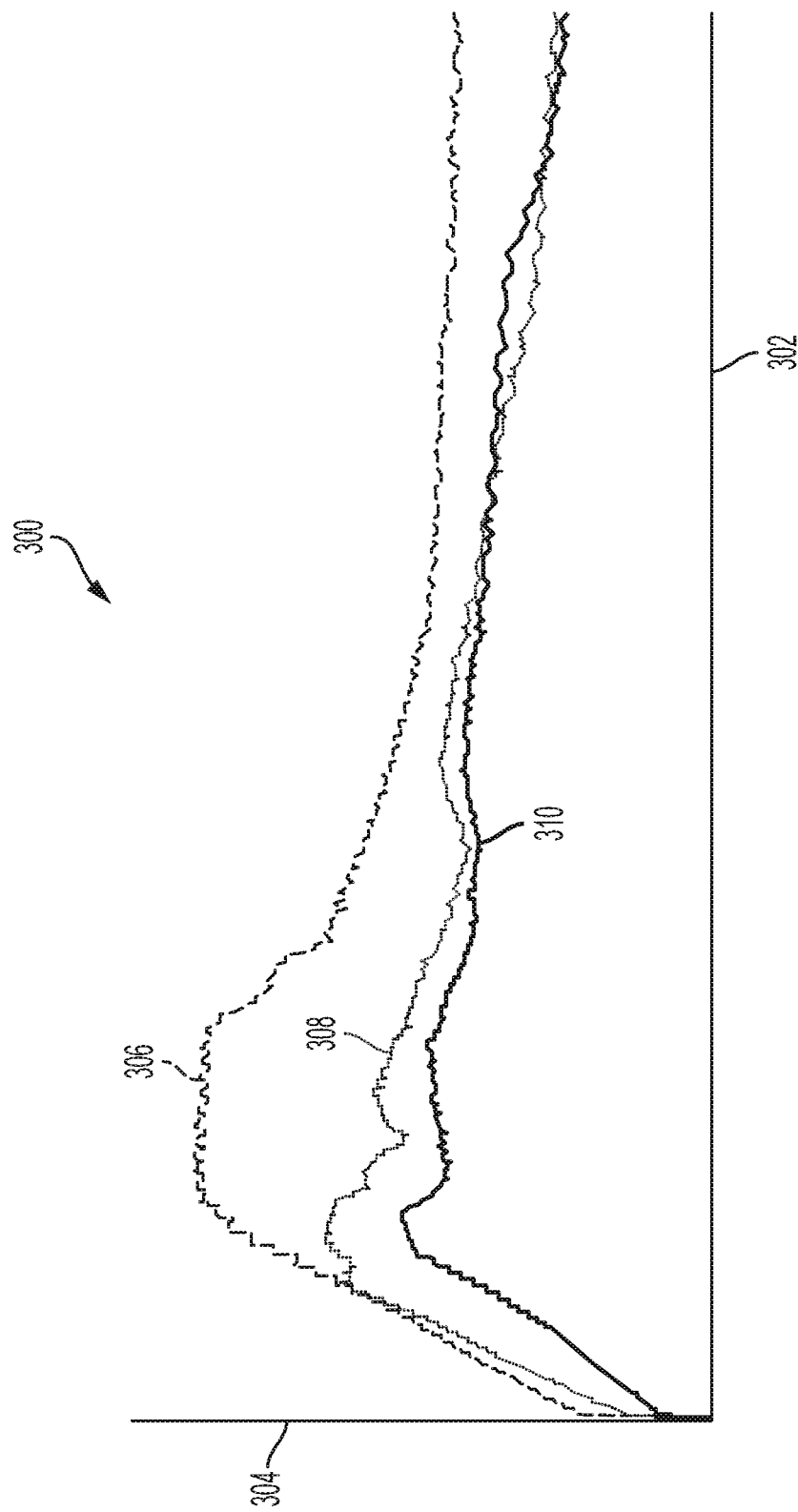
FIG. 3 is a graph illustrating the power consumption for a vehicle HVAC module.

Referring now to the graph 300 of FIG. 3, the graph 300 illustrates the power consumption for a vehicle HVAC module. The horizontal axis 302 represents the passage of time and the vertical axis 304 represents the power consumption of a vehicle HVAC module. Line 306 illustrates the power consumption for a vehicle HVAC module operated by a conventional vehicle cabin thermal management system while lines 308 and 310 illustrate the power consumption for a vehicle HVAC module incorporated into an exemplary vehicle cabin thermal management system in accordance with the present disclosure. The difference between the responses illustrated by lines 308 and 310 represent the different power consumption levels of a vehicle HVAC module when a non-convective heat transfer device is operated on different levels by the exemplary vehicle cabin thermal management system.

Figure 4:
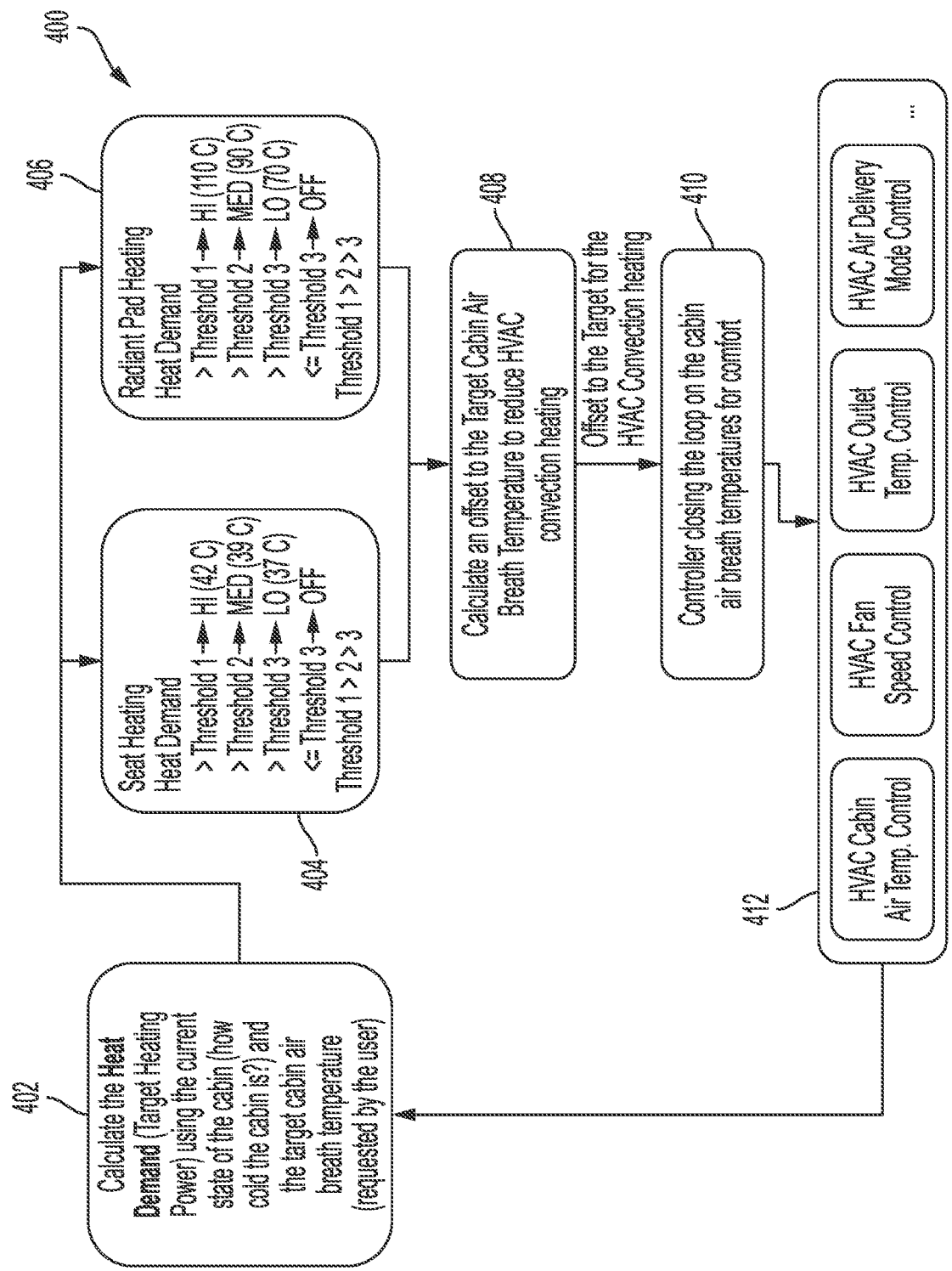
FIG. 4 illustrates a flowchart of an exemplary method for a vehicle cabin thermal management system in accordance with the present disclosure.

FIG. 4 illustrates a flowchart 400 of an exemplary method for a vehicle cabin thermal management system in accordance with the present disclosure. The method starts at step 402 where a processor in a controller calculates a cabin heating demand based upon the current conditions of the vehicle cabin and a target cabin air breath temperature. Exemplary systems and methods for estimating a cabin air temperature of a vehicle is disclose in, for example, co-assigned, U.S. Pat. No. 10,393,595 that issued on Aug. 27, 2019, and which is incorporated herein in its entirety. Next, in step 404, the exemplary vehicle cabin thermal management system determines a seat heating demand and a corresponding operating level for a seat heating device based upon the results of the cabin heating demand. Additionally, in step 406, the exemplary vehicle cabin thermal management system determines a radiant heating demand and a corresponding operating level for a radiant heating device based upon the results of the cabin heating demand. Next, in step 408, the exemplary vehicle cabin thermal management system calculates an offset value to the target cabin air breath temperature based upon the operating levels of the seat heating and radiant heating devices determined in steps 404 and 406. Next, in steps 410 and 412, the exemplary vehicle cabin thermal management system uses the calculated temperature offset to adjust the operating level of the HVAC module. Step 412 illustrates alternative optional operating modules within a HVAC module which may have their operating levels adjusted in a conventional manner based upon the adjusted cabin heating demand (and offset Tcomfort value) as explained above. Next, the method of the exemplary vehicle cabin thermal management system returns to step 402.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:
1. A vehicle cabin thermal management system, the system comprising:
   a first heat exchange system adapted to operate primarily based upon a convective mode of heat transfer within a vehicle cabin;

a second heat exchange system adapted to operate primarily based upon a non-convective mode of heat transfer within the vehicle cabin; and a controller in communication with the first heat exchange system, the second heat exchange system, wherein the controller controls a thermal output of the second heat exchange system, and wherein the controller controls the first heat exchange system to reduce an operating level of the first heat exchange system in response to the controller operating the second heat exchange system and based on a cabin heating demand, wherein:

$$\text{cabin heating demand} = \Sigma h_i A_i (T_{surface\ i} - T_{comfort})$$

and wherein $h_i$ is a convection heat transfer coefficient for cabin interior surfaces, $A_1$ is a surface area for the cabin interior surfaces, $[[T_{surface}]]T_{surface\ i}$ is a calculated temperature for the cabin interior surfaces, and $T_{comfort}$ is a cabin interior comfort temperature.

2. The system of claim 1, wherein the first heat exchange system comprises a heating/ventilation and air conditioning (HVAC) system.

3. The system of claim 2, wherein the HVAC system comprises a blower motor and a heat exchanger.

4. The system of claim 1, wherein the second heat exchange system comprises a radiant heater.

5. The system of claim 1, wherein the second heat exchange system comprises a conductive heater.

6. The system of claim 5, wherein the conductive heater comprises a seat heating element.

7. The system of claim 1, wherein the controller reduces the thermal output of the second heat exchange system and increases a power consumption of the first heat exchange system in response to the reduction in thermal output of the second heat exchange system.

8. A vehicle with a vehicle cabin thermal management system, the system comprising:

an HVAC system adapted to operate primarily based upon a convective mode of heat transfer within a vehicle cabin;

a radiant heater adapted to operate primary based upon a radiant mode of heat transfer within the vehicle cabin; and a controller in communication with the HVAC system and the radiant heater, wherein the controller controls a thermal output of the radiant heater, and wherein the controller controls the HVAC system to reduce an operating level of the HVAC system in response to the controller operating the radiant heater and based on a cabin heating demand, wherein:

$$\text{cabin heating demand} = \Sigma h_i A_i (T_{surface\ i} - T_{comfort})$$

and wherein $h_i$ is a convection heat transfer coefficient for cabin interior surfaces, $A_i$ is a surface area for the cabin interior surfaces, $[[T_{surface}]]T_{surface\ i}$ is a calculated temperature for the cabin interior surfaces, and $T_{comfort}$ is a cabin interior comfort temperature.

9. The system of claim 8, wherein the HVAC system comprises a blower motor and a heat exchanger.

10. The system of claim 8, wherein the controller reduces the thermal output of the radiant heater and increases the operating level of the HVAC system in response to the reduction in thermal output of the radiant heater.

11. A vehicle with a vehicle cabin thermal management system, the system comprising:

a first heat exchange system adapted to operate primarily based upon a convective mode of heat transfer within a vehicle cabin, wherein the first heat exchange system comprises a heating/ventilation and air conditioning (HVAC) system;

a second heat exchange system adapted to operate primarily based upon a non-convective mode of heat transfer within the vehicle cabin, wherein the second heat exchange system comprises a seat heater;

a third heat exchange system adapted to operate primarily based on a radiating mode of heat transfer within the vehicle cabin, wherein the third heat exchange system comprises a radiant heater attached to a roof within the vehicle cabin; and a controller in communication with the first heat exchange system, the second heat exchange system, and the third heat exchange system, wherein the controller controls a thermal output of the second heat exchange system and the third heat exchange system, and wherein the controller controls the first heat exchange system to reduce an operating level of the first heat exchange system in response to the controller operating the second heat exchange system, and the third heat exchange system, based upon a cabin heating demand, wherein:

$$\text{cabin heating demand} = \Sigma h_i A_i (T_{surface\ i} - T_{comfort})$$

and wherein $h_i$ is a convection heat transfer coefficient for cabin interior surfaces, $A_i$ is a surface area for the cabin interior surfaces, $[[T_{surface}]]T_{surface\ i}$ is a calculated temperature for the cabin interior surfaces, and $T_{comfort}$ is a cabin interior comfort temperature.

12. The system of claim 11, wherein the HVAC system comprises a blower motor and a heat exchanger.

13. The system of claim 11, wherein the controller reduces the thermal output of the second heat exchange system and the third heat exchange system and increases a power consumption of the first heat exchange system in response to the reduction in thermal output of the second heat exchange system and the third heat exchange system.

* * * * *